United States Patent
Smith et al.

(10) Patent No.: US 9,258,237 B1
(45) Date of Patent: Feb. 9, 2016

(54) ENHANCING DOCSIS SERVICES THROUGH NETWORK FUNCTIONS VIRTUALIZATION

(71) Applicant: Juniper Networks, Inc., Sunnyvale, CA (US)

(72) Inventors: Andrew J. Smith, Malvern, PA (US); Jonathan C. Barth, Collegeville, PA (US)

(73) Assignee: Juniper Networks, Inc., Sunnyvale, CA (US)

( * ) Notice: Subject to any disclaimer, the term of this patent is extended or adjusted under 35 U.S.C. 154(b) by 148 days.

(21) Appl. No.: 14/037,130

(22) Filed: Sep. 25, 2013

Related U.S. Application Data

(60) Provisional application No. 61/836,074, filed on Jun. 17, 2013.

(51) Int. Cl.
*H04W 28/12* (2009.01)
*H04L 12/803* (2013.01)

(52) U.S. Cl.
CPC .................................. *H04L 47/122* (2013.01)

(58) Field of Classification Search
CPC ... H04L 47/32; H04L 47/125; H04L 41/0672; H04L 41/0843; H04L 41/0816
USPC .................................................. 370/230, 235
See application file for complete search history.

(56) References Cited

U.S. PATENT DOCUMENTS

| | | | |
|---|---|---|---|
| 7,092,397 B1 * | 8/2006 | Chandran et al. | 370/395.5 |
| 7,184,437 B1 | 2/2007 | Cole et al. | |
| 7,376,718 B2 * | 5/2008 | Gould et al. | 709/220 |
| 7,697,429 B2 * | 4/2010 | Godlewski | 370/231 |
| 7,894,445 B2 * | 2/2011 | Godas et al. | 370/395.21 |
| 7,948,883 B1 * | 5/2011 | Croft et al. | 370/230 |
| 8,830,834 B2 * | 9/2014 | Sharma | H04L 45/64 370/235 |
| 8,995,305 B2 * | 3/2015 | Shaik | H04M 15/64 370/252 |
| 9,014,191 B1 * | 4/2015 | Mandal | H04L 12/46 370/392 |
| 2008/0044181 A1 | 2/2008 | Sindhu | |
| 2011/0113146 A1 * | 5/2011 | Li et al. | 709/228 |
| 2014/0269293 A1 * | 9/2014 | Patrick et al. | 370/233 |

OTHER PUBLICATIONS

"Service Chaining," Juniper Networks, Sep. 16, 2013, retrieved from http://juniper.net/techpupbs/en_US/contrail1.0/topics/task/configuration/service-chaining-vinc.html, 3 pp.

(Continued)

*Primary Examiner* — Rasheed Gidado
(74) *Attorney, Agent, or Firm* — Shumaker & Sieffert, P.A.

(57) ABSTRACT

This disclosure describes techniques for provisioning a CMTS to re-direct customer traffic into virtualized network functions (NFVs) service chains. This disclosure describes, in one example, techniques for providing linkage between DOCSIS service flows and NFV service chains in the DOCSIS provisioning system by embedding information within cable modem boot files used to configured cable modems within the broadband system. In one example, the techniques facilitate the definition of an NFV service-chain in the DOCSIS cable modem boot file provisioning system. A supported CMTS, CCAP or Edge Router intercepts and interprets the configuration to install packet classifiers that steer specific subscriber flows, as detailed in the DOCSIS cable modem boot file, through the service-chain.

18 Claims, 6 Drawing Sheets

(56) References Cited

OTHER PUBLICATIONS

"Enabling Service Chaining on Cisco Nexus 1000V Series Introduction White Paper," Cisco, Sep. 27, 2012, retrieved from http://www.cisco.com/c/en/us/products/collateral/switches/nexus-1000v-switch-vmware-vsphere/white_paper-C11-716028.pdf, 25 pp.

"3GPP TS 29.212—Policy and Charging Control (PCC); Reference Points (Release 11)," Version 11.7.0, Feb. 2012, 196 pp.

"3GPP TS 23.203—Policy and Charging Control Architecture (Release 10)" Version 10.1.0, 3rd Generation Partnership Project, Technical Specification Group Services and System Aspects, Sep. 2010, 132 pp.

Cablelabs et. al, Data-Over-Cable Service Interface Specifications, DOCSIS 1.1, Operations Support System Interface Specification, SP-OSSI-v1.1, Cable Television Laboratories, Inc., Louisville, CO., Mar. 12, 2003, 70 pp.

Cablelabs et. al, Data-Over-Cable Service Interface Specifications, DOCSIS 3.0, MAC and Upper Layer Protocols Interface Specification, CM-SP-MULPlv3.0, Cable Television Laboratories, Inc., Louisville, CO., Aug. 3, 2007, 69 pp.

U.S. Appl. No. 14/042,685, by Jerome P. Moisand, filed Sep. 30, 2013.

U.S. Appl. No. 13/843,500, by Harshad Bhaskar Nakil, filed Mar. 15, 2013.

U.S. Appl. No. 13/842,453, by James M. Murphy, filed Mar. 15, 2013.

U.S. Appl. No. 14/042,499, by Jacopo Pianigiani, filed Sep. 30, 2013.

Response to Office Action dated Apr. 10, 2015, from U.S. Appl. No. 14/042,499, filed Jul. 10, 2015, 17 pp.

Final Office Action from U.S. Appl. No. 14/042,499, dated Aug. 17, 2015, 11 pp.

Office Action from U.S. Appl. No. 14/042,499, dated Nov. 9, 2015, 7 pp.

* cited by examiner

ENHANCING DOCSIS SERVICES THROUGH NETWORK FUNCTIONS VIRTUALIZATION

This application claims the benefit of U.S. Patent Application 61/836,074, filed Jun. 17, 2013, the entire content of which is incorporated herein by reference.

TECHNICAL FIELD

The disclosure relates to computer networks and, more particularly, delivery of data services over cable networks.

BACKGROUND

A cable network typically comprises an edge network that couples customer devices to a public network, such as the Internet, via coaxial or other cable. The cable network typically includes a network device referred to as a Cable Modem Termination System (CMTS) to facilitate this access via the coaxial cable. Coupled to one end of the coaxial cable, the CMTS usually resides in a central office and manages cable modems (CMs) coupled to the opposite end of the coaxial cable that reside within the customer's premises. Both the CMTS and the CMs convert data, usually received in packet form, into Radio Frequency (RF) signals for delivery over the coaxial cable, whereupon at either end of the coaxial cable, the CMTS or CMs reconvert the RF signal back into the data packets.

The customers may couple various devices to the CM, which originate the data packets for delivery upstream from the CM to the CMTS via the coaxial cable. In this manner, the customer devices may interface with the public network via the cable network to download and/or upload data or content. The customer devices, which may be referred to herein as Customer Premises Equipment (CPE), may include desktop computers, laptop computers, network-enabled televisions and digital Set-Top Boxes (STBs).

Usually, each customer subscribes to and pays for, as part of the cable data service, a particular level of service, such as a set amount of bandwidth. To provide this level of service, the CMTS may provide, in accordance with a standard referred to as Data Over Cable System Interface Specification (DOCSIS), all subscriber or customer management functions by which to register CMs for operation within the cable network at the corresponding purchased level of service. These customer management functions may include maintaining CM service profiles for each CM that indicate, in part, the level of service provided to traffic originating from a corresponding CM. The CMTS may therefore be considered to "own" this customer management functionality. As a result, the CMTS may represent the only type of network device within conventional cable networks that is "aware" of individual customers, as the CMTS is the only type of network device required by DOCSIS to interface individually with the CMs and associated CPE.

SUMMARY

The disclosure describes mechanisms to integrate virtualized network functions, referred to herein as "Network Function Virtualization (NFV) resources" or as a "service-chain," with broadband services. This disclosure describes how Network Functions Virtualization (NFV), an effort within the Software Defined Networking (SDN) community, can be used as an enhancement to broadband data services delivered by, for example, Data Over Cable System Interface Specification (DOCSIS)-compliant systems. As one example, the techniques described in this disclosure provide mechanisms to implement chained network services to subscriber traffic in a DOCSIS broadband system using NFV techniques.

In general, Network Functions Virtualization represents a potential new area of innovation in cable high-speed data services. For example, a conventional DOCSIS system does not directly define a service offered to a subscriber, but rather the parameters around a service. The use of classifiers, service-flows and the like may define parameters with respect to a service, such as high-speed data, a layer three virtual private network (L3VPN) service, a layer two VPN (L2VPN) service or the like, but does not define, or enhance, actual services delivered over a DOCSIS broadband system.

In some aspects, this disclosure provides techniques for integrating DOCSIS-based broadband networks with software defined networking (SDN) technologies. As one example, as opposed to having DOCSIS traffic terminate on an IP interface on a CMTS, this disclosure describes techniques that allow upstream or downstream subscriber traffic to be switched or otherwise forwarded into one or more NFV service chains. Moreover, the NFV service chains represent a set of network services that may be provided by a cluster of service nodes providing an execution environment for the NFV service chains, where the service nodes may be local to the cable service provider, located remotely (e.g., "in the cloud") or a combination thereof.

In one example, this disclosure describes techniques in which NFV within a DOCSIS environment may be defined and driven in the DOCSIS provisioning system using a cable modem boot file to be used when configuring one or more cable modems associated with corresponding subscribers. This example implementation defines an NFV service-chain of one or more services in the DOCSIS cable modem boot file provisioning system. A supported CMTS, Converged Cable Access Platform (CCAP) or Edge Router, which may snoop on the deployment of the boot file to a given cable modem or other customer premise equipment (CPE), interprets specialized configuration data within the boot file that directs the device (e.g., the CMTS, CCAP or router) to steer specific flows, as detailed in the DOCSIS cable modem boot file, through a particular service-chain, i.e., a defined set of services in a specified order. Based on the cable modem boot file, the CMTS is able to determine exactly which stream(s) of traffic (called service-flow(s)) match criteria associated with flows to be delivered to and processed by a specific NFV service-chain. In this manner, subscriber-based policy provisioning for services (e.g., layer 4-7 services) can be provided. In this way, the techniques described herein permit cable operators to create sophisticated services on DOCSIS-based broadband systems through the use of elastic NFV virtualized services. Moreover, the service chains may be implemented using standard, off-the-shelf hardware, such as x86-based computers.

In one example, a method comprising receiving, by a network device, a cable modem boot file for configuring a cable modem in a cable network. The method further includes identifying, with the network device, information in the cable modem boot file that specifies an association between a specific Data Over Cable System Interface Specification (DOCSIS) service flow for the particular cable modem and a service chain defining a plurality of network services provided by a plurality of service nodes. In addition, the method includes determining that network traffic received from the cable modem matches the DOCSIS service flow, and re-directing the network traffic onto one or more tunnels to the service chain for application of the network services In another example, a network device, such as a router or CMTS, comprises a control unit in which a processor is configured to intercept and process a cable modem boot file being deployed in the broadband cable network to configure a particular cable modem. The processor of the network device processes the cable modem boot file to identify an association between a specific Data Over Cable System Interface Specification (DOCSIS) service flow for the subscriber and a particular service chain that defines a plurality of network services provided by a plurality of service nodes. A packet redirection module is configured by the processor to detect that network traffic received from the cable modem matches the DOCSIS service flow and, in response to the detection, re-direct the network traffic onto one or more tunnels to the service chain for application of the network services.

In another example, a computer-readable storage device comprises instructions that, when executed, cause a programmable processor of a network device to receive, by a network device, a cable modem boot file for configuring a cable modem in a cable network. The instructions further cause the processor to identify, with the network device, information in the cable modem boot file that specifies an association between a specific Data Over Cable System Interface Specification (DOCSIS) service flow for the particular cable modem and a service chain defining a plurality of network services provided by a plurality of service nodes. In addition the instructions cause the processor to install a packet classifier within a forwarding component of the network device to detect network traffic received from the cable modem that matches the DOCSIS service flow and, in response to the detection, re-direct the network traffic onto one or more tunnels to the service chain for application of the network services The techniques of this disclosure may provide one or more advantages. The techniques of this disclosure may allow cable operators to take advantage of a next generation, revenue-enhancing services-plane that are, for example, provided by SDN controllers and service nodes that are generally decoupled from the highly-customized, DOCSIS-based equipment of the service provider. This integration of NFV and DOCSIS allowing a service provider to construct service chains may increase network efficiency, enable new revenue opportunities, and permit rapid service innovation.

The details of one or more examples are set forth in the accompanying drawings and the description below. Other features, objects, and advantages will be apparent from the description and drawings, and from the claims.

DETAILED DESCRIPTION

Figure 1:
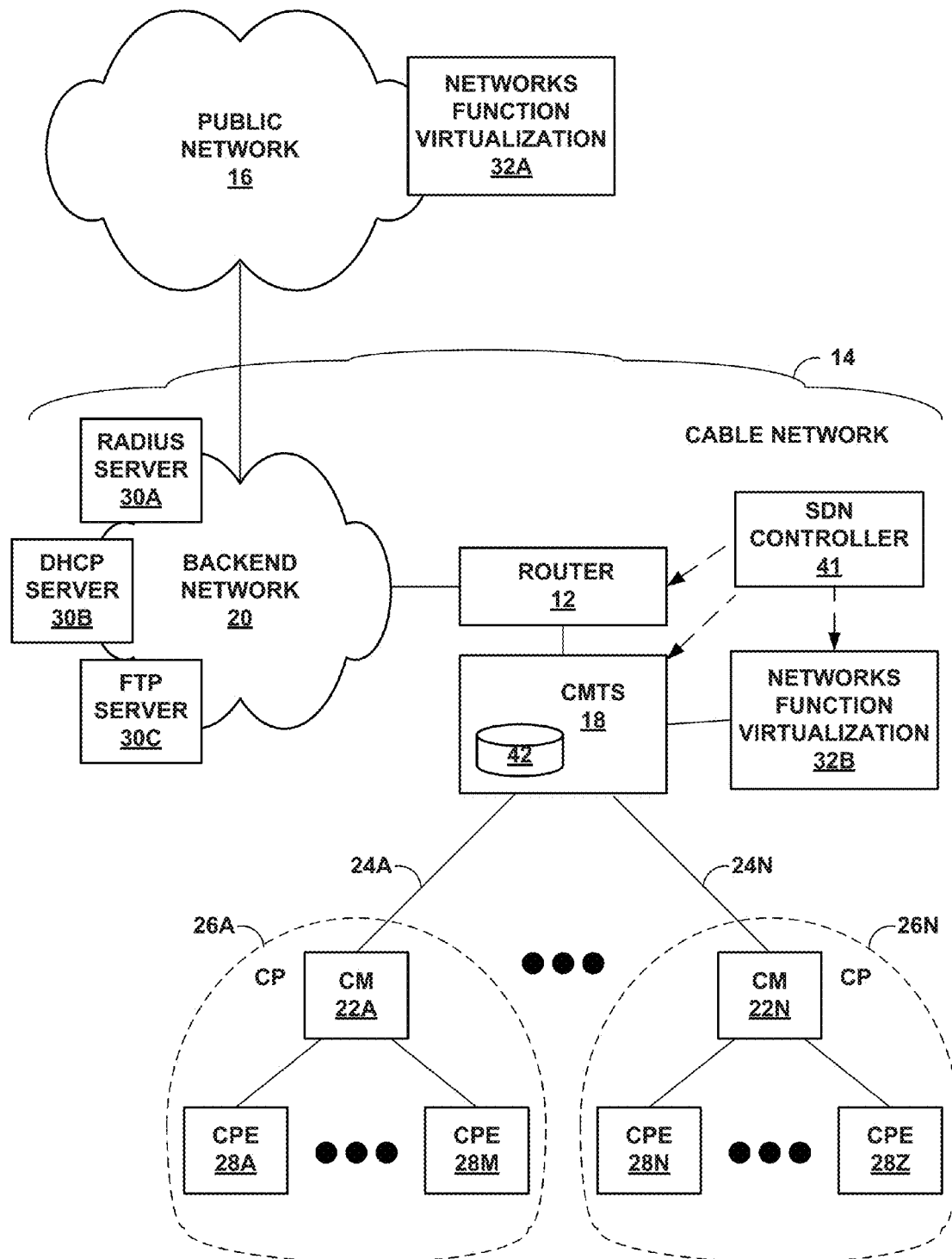
FIG. 1 is a block diagram illustrating an exemplary network system in which a Cable Modem Termination System directs subscriber flows to receive services "in the cloud" in accordance with the techniques described herein.

FIG. 1 is a block diagram illustrating an exemplary network system 10 in which a Cable Modem Termination System 18 ("CMTS 18") directs subscriber flows to receive services "in the cloud" in accordance with the techniques described herein. Network system 10 includes a cable network 14 that provides data connectivity to a public network 16. Cable network 14 includes router 12, CMTS 18 and a backend network 20, where router 12 is positioned between CMTS 18 and backend network 20. While described in this disclosure with respect to a router 12, the techniques may be implemented by any network device positioned between a CMTS or similar network device and a backend network that is capable of applying differentiated services to network traffic within a cable network.

While not shown in FIG. 1, cable network 14 may include various infrastructure, such as an office and other buildings, in which router 12, CMTS 18 and backend network 20 may reside. For example, cable network 14 may comprise a central office in which both of router 12 and CMTS 18 reside. As a result, FIG. 1 illustrates router 12 as included within cable network 14, however, router 12 may, in some embodiments, reside in other locations separate from CMTS 18 and backend network 20.

Public network 16 may comprise any publically accessible computer network, such as the Internet. Public network 16 may include a wide variety of interconnected computing devices or nodes, such as web servers, print servers, application servers, data servers, workstations, desktop computers, laptop computers, cellular or other mobile devices, Personal Digital Assistants (PDAs), and any other device cable of connecting to a computer network via a wireless and/or wired connection. These devices may be organized into one or more networks, wherein the collection of networks is illustrated in FIG. 1 as a single public network 16. Typically, these devices communicate with one another via a packet-based protocol, such as an Internet Protocol (IP)/Transmission Control Protocol (TCP). As a result, public network 16 may represent or be referred to as a "packet-based" computer network.

Cable network 14 is an edge network, in that cable network 14 resides at the edge of public network 14. Cable network 14 may be referred to as connecting the "last mile" in that cable network 14 provides, manages and/or maintains approximately or loosely the last mile of infrastructure to facilitate access by customers to public network 14. To provide and maintain this access, cable network 14 includes CMTS 18 and backend network 20, where CMTS 18 couple to Cable Modems (CMs) 22A-22N ("CMs 22") via coaxial cables 24A-24N ("coaxial cables 24"). Each of CMs 22 typically resides in a separate customer premises (CP) 26A-26N ("CPs 26") along with respective Customer Premises Equipment (CPE) 28A-28Z ("CPE 28"). One or more of CPE 28 couple to respective CMs 22 via either a wired or wireless connection, where the connection typically occurs via one of the 802.1X family of communication protocols.

CMTS 18 may represent a network device that receives data, often in packet form, from public network 16 and converts the data to a Radio Frequency (RF) signal for transmission over coaxial cables 24. While shown as separate coaxial cables 24 for ease of illustration purposes, CMTS 18 typically couples to a plurality of CMs 22 via a single coaxial cable, such as coaxial cable 24A. Moreover, while described herein as coaxial cables 24, in some instances coaxial cable only comprise a portion of the link between CMs 22 and CMTS 18, with other transmission mediums, such as fiber optical cable comprising the other portion of the link between CMs 22 and CMTS 18. However, again, for each of illustration, the links between CMTS 18 and CMs 22, as well as the links between CMs 22 and CPEs 28, may be referred to herein as "coaxial cables." Thus, while CMTS 18 may convert the data received from public network 16 into RF signals, other devices intermediate to CMTS 18 and CMs 22 may further convert the RF signals into other types of signals, such as optical signals.

CMTS 18 may also represent a network device that receives RF signals from downstream CMs 22 and converts these RF signals to data, which may comprise data packets, for transmission upstream to public network 16. "Upstream" communications may refer to communications directed from the edge cable network 14, CPE 28 and CMs 22, upstream through the center of cable network 14, e.g., CMTS 16 and router 12, to public network 16. "Downstream" communications may refer to communications directed from public network 16 downstream through the center of cable network 14, e.g., router 12 and CMTS 18, to the edge of cable network 14, e.g., CMs 22 and CPE 28.

CMTS 18 may further include components so as to provide layer three (3) functions, where "layer three" (L3) refers to the network layer of the Open Systems Interconnection (OSI) model. CMTS 18 may further operate in accordance with one of the various versions of a standard referred to as the "Data Over Cable Service Interface Specification" or DOCSIS for short. Each of these versions of DOCSIS, or simply DOCSIS, provides a standard by which cable network 14 may enable customers or, more particularly, CPE 28 to access public network 16 via cable network 14. DOCSIS may, for example, specify the necessary customer management functions cable network 14 need perform to ensure each customer receives a particular level of service to which the customer subscribed. Typically, CMTS 18 provides these customer management functions, relying on support services provided by backend network 20. Further information with respect to the DOCSIS standard is described in Cablelabs, et. al, *Data-Over-Cable Service Interface Specifications*, DOCSIS 1.1, Operations Support System Interface Specification, SP-OSSI-v1.1, Cable Television Laboratories, Inc., Louisville, Colo., 2003, and Cablelabs, et. al, *Data-Over-Cable Service Interface Specifications*, DOCSIS 3.0, MAC and Upper Layer Protocols Interface Specification, CM-SP-MULPIv3.0, Cable Television Laboratories, Inc., Louisville, Colo., 2007, the entire contents of each of which are incorporated herein by reference.

Backend network 20 may comprise a sub-network of cable network 14 that includes Remote Authentication Dial-In User Service (RADIUS) server 30A, a Dynamic Host Configuration Protocol (DHCP) server 30B, and a File Transfer Protocol (FTP) server 30C. Network 20 may be referred to as a "backend" network in that it resides at the back-end of cable network 14 transparent to customers 28. Often backend networks, such as backend network 20, provide storage and other resources useful in the operation of a parent network, such as cable network 14.

For example, RADIUS server 30A of backend network 20 may comprise a server that implements the RADIUS protocol by which one or more of network devices included within cable network 14, such as router 12, CMTS 18 and CMs 22, may request authentication to access cable network 14. RADIUS server 30A may maintain authentication information used for authenticating each of these network devices. RADIUS server 30A may therefore provide an authentication support service within cable network 14 to authenticate network devices prior to permitting these devices to access cable network 14.

DHCP server 30B of backend network 20 may comprise a server that implements DHCP by which one or more of the network devices of cable network 14, such as CMs 22 and CPE 28, may request parameters required by the network devices to operate in cable network 14. As cable network 14 typically operates as an Internet Protocol (IP) network, these parameters may include parameters required by the network devices to operate in an IP network, such as cable network 14. These IP parameters may include an IP address and other parameters particular to cable networks, such as a location of a CM configuration file. In this respect, DHCP server 30B may maintain an address space comprised of a plurality of network addresses and may assign an address (e.g., an IP address) to each network device permitted to access cable network 14. In other words, DHCP server 30B may provide an address resolution and assignment support service that enables each network device of cable network 14 to be individually and distinctly addresses and located within cable network 14.

FTP server 30C of backend network 20 may comprise a server that implements FTP by which one or more of the network devices of cable network 14, such as CMs 22, may request configuration files stored within FTP server 30C. As explained in further detail below, the configuration files, referred to herein in one example as DOCSIS cable modem boot files, stored by FTP server 30C provide a mechanism that allows service chains to be applied to subscriber flows. CMTS 18 or router 12, for example, interpret configuration within the cable modem boot files and steer specific flows, as detailed in the DOCSIS cable modem boot file, through the service-chains. Based on the cable modem boot files, CMTS 18 determines exactly which streams of traffic (called service-flows) match criteria specified for particular Network Function Virtualization (NFV) service-chains. Moreover, CMTS 18 directs the matching flows through the nodes within NFVs 32A or 32B NFV in accordance with the defined service chains. In this manner, subscriber-based policy provisioning for layer 4-7 services can be provided.

In some instances, FTP server 30C may implement a simplified form of FTP referred to as Trivial FTP or TFTP, and in these instances, FTP server 30C may comprise a TFTP server 30C. The location of the CM configuration file referred to above may represent a filename identifying the CM configuration file, as well as, an address assigned to FTP server 30C. FTP server 30C may therefore represent a server that implements FTP or a variation thereof, such as TFTP, by which CMs 22 request a CM configuration file stored within FTP server 30C. FTP server 30C may, in this respect, provide a remote file storage and retrieval support service useful in registering CMs 22 within cable network 14, as described in more detail below.

CMTS 18 may therefore rely on servers 30A-30C ("server 30") to provide these authentication, address resolution and assignment, and file storage and retrieval supports services in order to manage data services to be provided to each subscriber/customer. For example, upon powering on, starting up or otherwise activating one of CMs 22, one of CMs 22 may interact with CMTS 18 to initialize itself within cable network 14. Initialization, according to DOCSIS, may comprise a number of phases, including one or more of 1) a phase concerning scanning and synchronization downstream, 2) a phase concerning obtaining upstream parameters, 3) a phase relating to ranging and automatic adjustments, 4) a phase related to establishing IP connectivity, 5) a phase concerning establishing a time of day, 6) a phase concerning transferring operational parameters, and 7) a phase relating to registration. During the first three phases, the CMTS 18 may generally synchronize the one of CMs 22 to correctly receive downstream traffic and assign a timeslot by which the one of CMs 22 may communicate upstream with CMTS 18, taking into account a range or distance the one of CMs 22 lies from CMTS 18.

The fourth phase related to establishing IP connectivity may comprise the initializing one of CMs 22 issuing a DHCP request to request an IP address and a location of the CM configuration file associated with the requesting one of CMs 22. CMTS 18 may forward this DHCP request to DHCP server 30B, which may respond to the CM with a DHCP response that assigns the one of CMs 22 an IP address from the plurality of addresses included within the address space maintained by DHCP server 30B. The DHCP response may also include a location, e.g., a filename and IP address assigned to FTP server 30C, of a CM configuration file associated with the one of CMs 22. CMTS 18 may maintain a file associated with the one of CMs 22 and, upon snooping or otherwise processing the DHCP request, update this corresponding file with the association between the MAC address of the one of CMs 22 and the IP address, thereby relying on DHCP server 30B to provide this IP address resolution and assignment service to CMs 22.

In the sixth phase concerning the transfer of parameters, the one of CMs 22 being initialized may access the location identified in the DHCP response to retrieve the CM configuration file associated with the one of CMs 22. The one of CMs 22 may issue an FTP, or in some instances a TFTP, request for the identified filename to the IP address assigned to FTP server 30C, for example. CMTS 18 may forward this FTP request to FTP server 30C, which may issue an FTP response that includes the CM configuration file associated with the one of CMs 22 that issued the FTP request. The CM configuration file may include a level of service, such as a bandwidth minimum or Quality of Service (QoS), CMTS 18 provides to the one of CMs 22. CMTS 18 may forward this response to the appropriate one of CMs 22, which may then utilize information in the CM configuration file to register with CMTS 22. CMTS 18 may perform an involved registration process by which CMTS 18, upon successful registration, agrees to provide, to the one of CMs 22, the level of service indicated in the corresponding CM configuration file.

After successful registration, the one of CMs 22 being initialized may permit one or more of respective CPE 28 to access cable network 14. To access cable network 14, much like CMs 22, each of respective CPEs 28 requires an address. Typically, each CPE 28 issues a DHCP request to DHCP server 30B, which responds with a DHCP response assigning an address, such as an IP address, to each of the requesting ones of CPE 28. CMTS 18 may associate each address assigned to one of CPE 28 with an address assigned to the one of CMs 22 within the file maintained for the one of CMs 22. As a result of maintaining this information or association between CMs 22 and corresponding CPE 28 coupled to each of CMs 22, CMTS 18 may be considered customer or subscriber aware.

The disclosure describes mechanisms to integrate Network Function Virtualization (NFV) resources, called a service-chain, with broadband services. For example, the techniques may be used to integrate NFV resources that conform to those proposed by the European Telecommunications Standard Institute (ETSI), a group of service providers and operators, at the SDN and OpenFlow World Congress in 2012. This may allow cable service providers to leverage modern generic computation and software virtualization systems, either locally or in the cloud, to enable a new platform upon which to build high-touch network services and revenue models. The number of proprietary hardware appliances is reduced, with an increase of standard x86-style compute platforms and software implemented on data and control plane packet processing. Some benefits of NFV include, for example, reduction in equipment costs and power through economies of scale, increased innovation velocity through software development, elastic scaling of a services-plane within a network, and open and robust services innovation.

In the example of FIG. 1, a network operator can configure NFV service-chain information on CMTS 18. The operator can choose any combination of service flows, rate limits, TOS markings or packet classifiers when choosing which traffic will, or will not, be subject to NFV functionality. In some examples, SDN controller 41 provides a high-level controller for configuring and managing routing and switching infrastructure of cable network 14 (e.g., router 12 and any devices between CMTS 18 and NFV 32B), configuring CMTS 18 and managing deployment of virtual machines within the operating environment of NFV 32B. For example, SDN controller 41 may interact with CMTS to specify NFV service-chain information. For example, the NFV service-chain information provided by SDN controller 41 may specify any combination and ordering of services provided by NFVs 32 (i.e., service flows), traffic engineering information (e.g., labels or next hops) for tunneling or otherwise transporting (e.g., MPLS or IP tunnels) subscriber traffic to the NFVs, rate limits, Type Of Service (TOS) markings or packet classifiers that specify criteria for choosing which traffic will, or will not, be subject to NFV functionality and so as to select a particular service chain, if any, for a given subscriber packet flow. Further example details of an SDN controller are described in PCT International Patent Application PCT/US13/44378, filed Jun. 5, 2013, the contents of which are incorporated herein by reference.

In operation, during initialization, one of CMs 22 fetches its DOCSIS cable modem boot file from FTP server 30C via CMTS 18. CMTS 18 may snoop on this exchange, may act as a proxy or may otherwise process the CM boot file provided to the CM. As described below, in addition to containing configuration information for the one of CMs 22 being initialized, the enhanced CM boot file includes additional information embedded therein for controlling CMTS 18 in redirecting packet flows for the particular subscriber through well-defined service chains. In one example, the presence of new TLVs in the DOCSIS cable modem boot file, as described below, may be used to trigger CMTS 18 to map a particular service-chain to appropriate packet flows matching criteria defined in the DOCSIS cable modem boot file. CMTS 18 stores this mapping to NFV services config data 42, such that the CMTS can subsequently redirect matching flows via pseudowires to one or more of NFVs 32A or 32B NFV interface 38 for application of NFV services, according to the defined service-chain. In some examples, CMTS 18 later receives the traffic flows back from NFVs 32 after application of NFV network services, and sends the traffic flows either to router 12 and on to its intended destination within public network 16 or to the corresponding CM 22, depending on whether the traffic is inbound or outbound. In other examples, NFVs 32 forward the traffic once processed. In this manner, CMTS 18 can re-direct packets on a flow-by-flow basis for application of services by NFV.

The services are "differentiated" in that CMTS 18 can direct network traffic for application of services by NFVs 32 on a customer-specific basis as CMTS 18 is "aware" of the individual traffic flows and is able to identify specific traffic flows associated with the individual subscribers. The services applied by NFVs 32 may differ from those typically provided by a CMTS. These differentiated services may therefore augment the standard services typically provided by CMTS 18. Example differentiated services include one or more of a firewall service, a parental control service, a deep packet inspection service, a load-balancing service, a virus scanning service, a video conferencing service, a mobile IP service, a packet filtering service, a web conferencing service, a media caching service, an analytics service, a lawful interception service, a network address translation (NAT) service, an HTTP filtering service and the like.

NFVs 32 may be one more network devices, and may implement the network services on virtual machines executing on the network device(s), for example. NFV introduces the concept of a "service chain" where the path a packet takes through a series of NFV instances is all dynamically set up through software.

CMTS 18 may implement the techniques described herein to increase customer awareness (since CMTS 18 may be one of the only devices in cable network 18 that is customer aware) and direct traffic to NFVs 32 for application of services that augment standard services conventionally offered by CMTS 18. These differentiated services may therefore augment the standard services typically provided by CMTS 18 such that NFVs 32 and CMTS 18 may cooperate to facilitate improved delivery of applications such as Voice over Internet Protocol (VoIP), video telephony, web conferencing, and the like, to Customer Premises Equipment (CPE) via the cable network. Considering the increased customer awareness, CMTS 18 may provision or apply these new or differentiated services on a per-subscriber or more granular basis.

Figure 2:
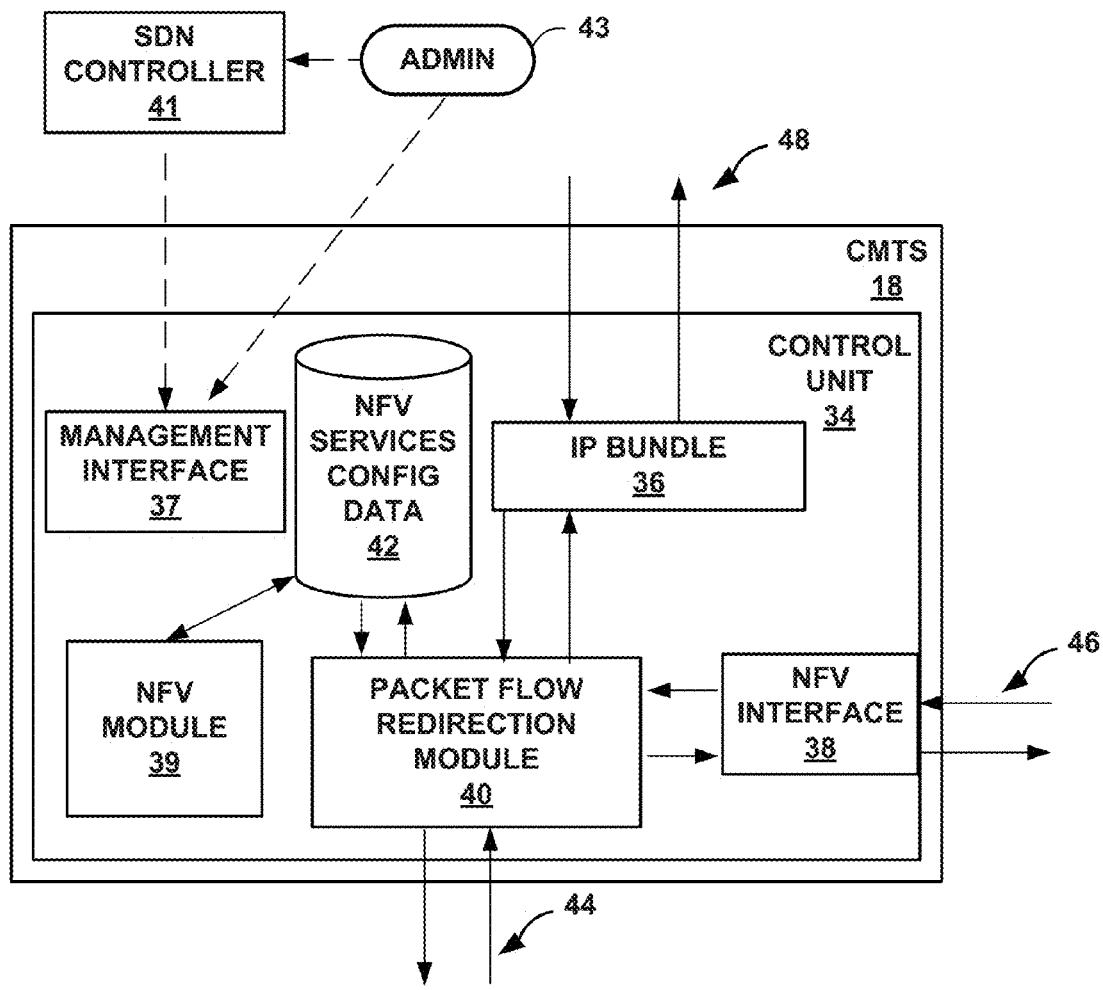
FIG. 2 is a block diagram illustrating an example CMTS in further detail.

FIG. 2 is a block diagram illustrating an example device that may direct subscriber traffic to network virtualized functions, such as CMTS 18. As shown in the example of FIG. 2, CMTS 18 includes a control unit 34. Control unit 34 may comprise one or more hardware processors (not shown in FIG. 2) that execute software instructions stored to a computer-readable storage medium (again, not shown in FIG. 2), such as a storage device (e.g., a disk drive, or an optical drive), or memory (such as Flash memory, random access memory or RAM) or any other type of volatile or non-volatile memory (non-transient storage medium), that stores instructions to cause a programmable processor to perform the techniques described herein. Alternatively, control units 34 may comprise dedicated hardware, such as one or more integrated circuits, one or more Application Specific Integrated Circuits (ASICs), one or more Application Specific Special Processors (ASSPs), one or more Field Programmable Gate Arrays (FPGAs), or any combination of one or more of the foregoing examples of dedicated hardware, for performing the techniques described herein.

Control unit 34 may include a plurality of modules, including packet flow redirection module 40, management interface 37, and NFV module 39. Control unit also includes IP bundle 36, NFV interface 38 and NFV services configuration data ("NFV services config data") 42. NFV interface 38 may be one or more logical interfaces. A logical interface may comprise a software abstraction that represents a physical interface.

In general, DOCSIS creates the concept of a "service flow." Similar to a DLCI in the frame relay world, a service flow is a virtual "circuit" over a DOCSIS system. Service flows can carry specific IP traffic (defined via a classifier, similar to an access-list), have specific transmission speeds, different QoS parameters, etc. All traffic over DOCSIS must match a service-flow. In one example, this disclosure proposes to match a DOCSIS service flow to a NFV service-chain using standard DOCSIS provisioning mechanisms. The pseudo-Ethernet frame format of DOCSIS lends itself well to this proposal. A new "target" or destination for service flows is added on a CMTS, which would be the NFV service chain. Specifically, in one example, this linkage or mapping between a DOCSIS service flow for a particular subscriber and a NFV service chain is embedded within the DOCSIS cable modem boot file for the subscriber, with CMTS 18 snooping on the DOCSIS cable modem boot file when the corresponding CM is initialized and storing the mapping within NFV services config data 42.

A network operator 43 and/or SDN controller 41 may interact with management interface 37 to specify NFV service-chain information, which may also be stored to NFV services config data 42. For example, the NFV service-chain information provided by SDN controller 41 and/or operator 43 may specify any combination and ordering of services provided by NFVs 32 (i.e., service flows), traffic engineering information (e.g., labels or next hops) for tunneling or otherwise transporting (e.g., MPLS or IP tunnels) subscriber traffic to the NFVs, rate limits, Type Of Service (TOS) markings or packet classifiers that specify criteria for choosing which traffic will, or will not, be subject to NFV functionality and so as to select a particular service chain, if any, for a given subscriber packet flow. An example service-chain "Set C" is described below.

In example operation, one of CMs 22 (FIG. 1) fetches its DOCSIS cable modem boot file from FTP server 30C via communications relayed through CMTS 18. CMTS 18 may snoop on this exchange, or may act as a proxy. As one example, presence of one or more new Type-Length-Values (TLVs) in the DOCSIS cable modem boot file triggers NFV module 39 of CMTS 18 to map a particular service-chain to the appropriate packet flows as defined in the DOCSIS cable modem boot file, and NFV module 39 stores this mapping to NFV services config data 42 such that packet flow redirection module 40 can redirect matching flows to NFV interface 38 for application of NFV services.

Thus, instead of traffic terminating on the IP Bundle interface 36, based on NFV services config data 42 stored to CMTS 18 in accordance with the cable modem boot file, packet flow redirection module 40 of CMTS 18 internally switches certain traffic flows directly into an NFV service chain via NFV interface 38, rather than to IP bundle 36. That is, if the traffic flow received from one of the CMs matches a filter defined in NFV services config data 42, packet flow redirection module 40 redirects the matching traffic to NFV interface 38 and, in some examples, encapsulates the traffic with an appropriate tunnel for transport and direction through the desired service chain. If the traffic flow received from one of the CMs does not match a filter defined in NFV services config data 42, packet flow redirection module 40 directs the traffic to IP bundle 36 to be output by CMTS 18 immediately to its destination. NFV interface 38 can tunnel the traffic through pseudowires, MPLS LSPs, IP tunnels and the like to steer the traffic to local or remote NFVs 32 for application of the services. CMTS 18 may then later receive the traffic flows back, after application of NFV network services, and packet flow redirection module 40 can then send the traffic flows to IP bundle 36. In this manner, CMTS 18 can re-direct packets on a flow-by-flow basis for application of services by NFV.

In the example of FIG. 2, traffic flows 44 represent traffic sent and received by CMTS 18 to/from cable modems 22 for communications associated with CPEs 28. Traffic flows 46 represent traffic sent and received by CMTS 18 to and from the local or remote service nodes, which may tunnel (encapsulate) traffic flows 44. Traffic flows 48 represent traffic sent and received by CMTS 18 to/from public network 16, for example.

Figure 3:
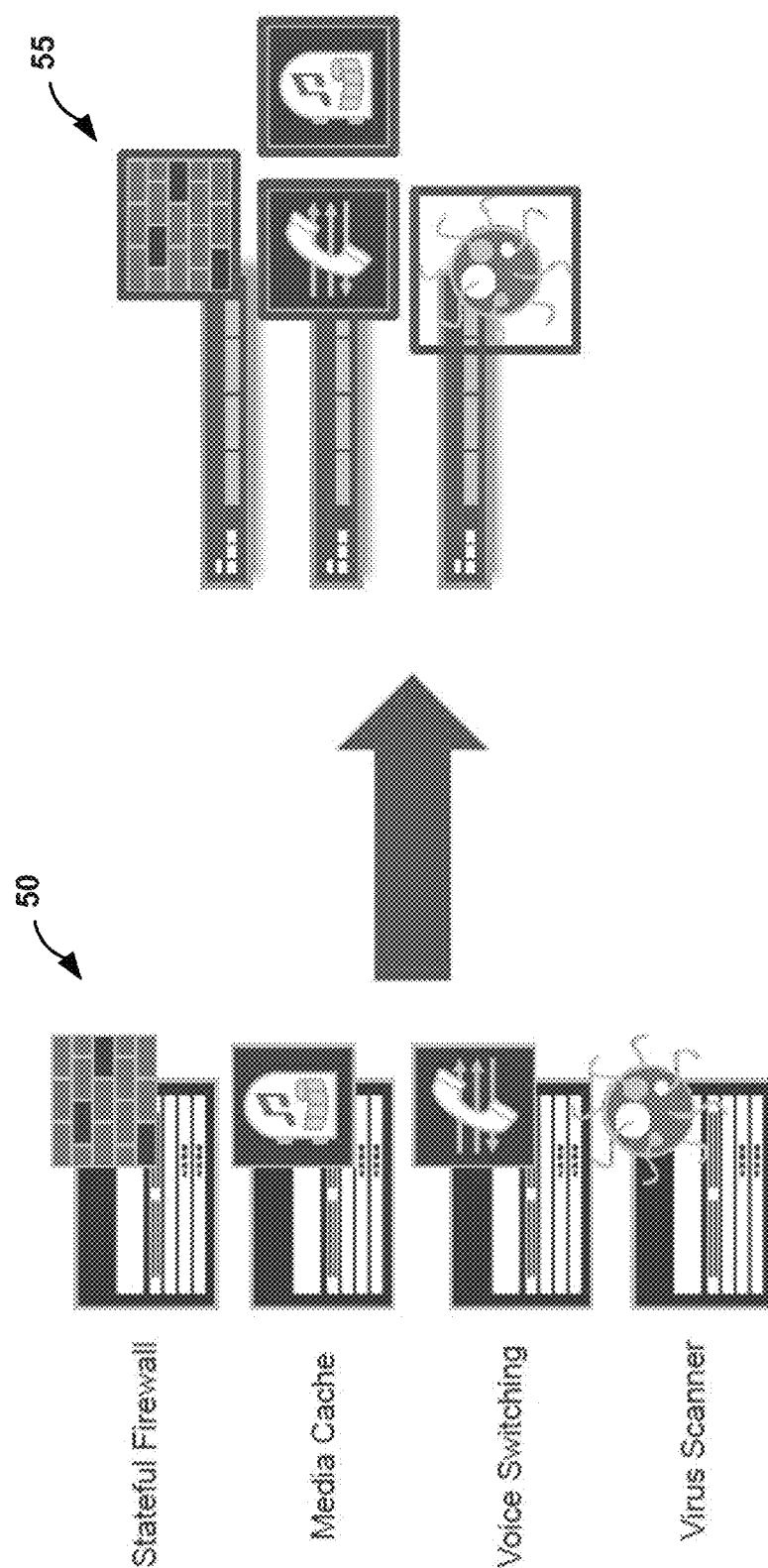
FIG. 3 is a block diagram illustrating a contrast between a system that utilizes dedicated network appliances per network service, as compared to an NFV system.

FIG. 3 is a block diagram illustrating a contrast between a first system 50 of dedicated network appliances per network service (e.g., stateful firewall, media cache, voice switching, and virus scanner), as compared to an NFV system 55, which provides a virtualized pool of resources for all of these services. Network Functions Virtualization presents an innovation opportunity for cable operators. Previous models of network service architecture required large, centralized service data centers (i.e. voice switching) or highly distributed, purpose built appliances (i.e. video caching), both with economic and operational challenges. To maintain large central data centers in cable environments requires service rates and take-up percentages to justify the build and operating costs. Distributed appliances have similar challenges, in that they must offset enough capital expenditure from "business as usual"—simply deploying more bandwidth—to become feasible.

The virtualized aspect of NFV permits one investment, in generic x86 computing resources, to be leveraged enabling many services. Where previous network services in system 50 were instantiated on dedicated, standalone appliances—each with their own vendor, support, operational model and depreciation schedule—now one investment can be made to support all services. In NFV system 55, services themselves run as virtual machines in an x86 compute environment. Individual services can scale just as in a modern data center, through the allocation of virtualized memory, CPU, storage and network policy, as well as horizontally by adding additional load-balanced virtual machines.

In one example implementation, the generic nature of this new services infrastructure enables this disclosure to propose an integration of DOCSIS and NFV, such that the cable operator can enable services on a per-service flow, per-cable modem or per-VPN nature. These services would be provisioned using the standard DOCSIS tools and existing TFTP and DHCP mechanisms of standard cable modem registration.

Figure 4:
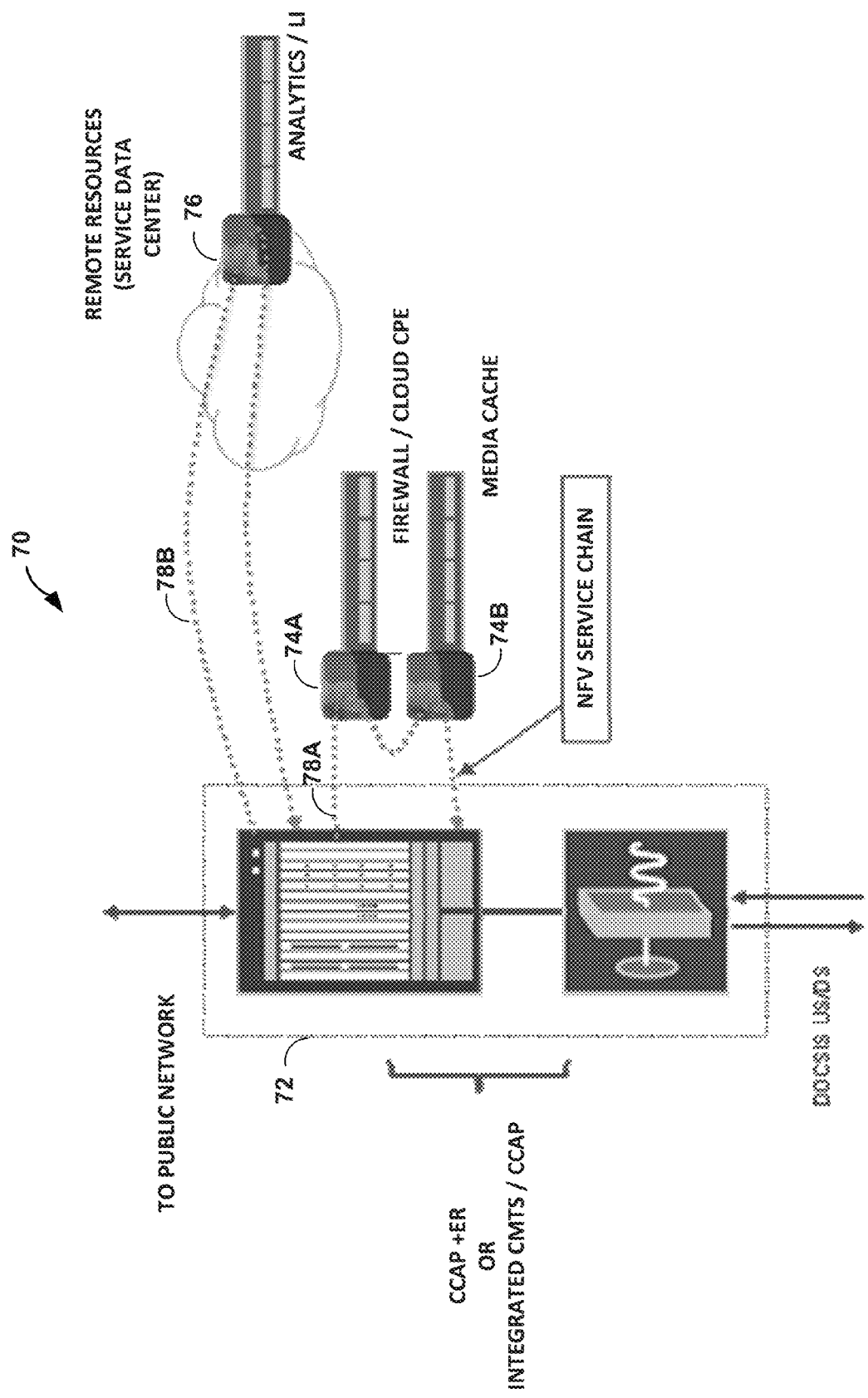
FIG. 4 is a block diagram illustrating an example system in which an example deployment scenario is set up in accordance with the techniques of this disclosure.

FIG. 4 is a block diagram illustrating an example system 70 in which an example deployment scenario is set up in a cable hub site with local x86 service elements 74A-74B and remote x86 service element 76. In CCAP/"Edge Router" (ER) 72, the ER manages IP sessions, IP routing, IP/MPLS services and implements NFV, while the CCAP handles specific MAC and PHY interfaces for DOCSIS. In an Integrated-CCAP or traditional CMTS architecture, all of this hardware and software functionality is typically built into a single chassis 72. Either architecture is capable of integrating NFV with DOCSIS in accordance with the techniques described herein. CCAP/ER 72 of FIG. 4 may represent, for example, router 12 and CMTS 18 of FIG. 1. Local service elements 74A-74B may represent NFV 32B of FIG. 1, and remote service element 76 may represent NFV 32A of FIG. 1.

In this example, three services have been virtualized: Analytics and Lawful Intercept (LI), Firewall and Cloud CPE, and a Media Cache. The lawful intercept function has been virtualized in a centralized manner at a service data center, while the other services are local to the hub site of the broadband service provider. The techniques described herein permit this flexibility—some services may have a very low usage rate where economies of scale will find the optimal placement to be in a central location. Policy may also dictate a centralized location, such as data security or integrity.

Services that are part of the data plane and potentially latency sensitive may be placed in the cable hub site. This is for performance optimization as well as to restrict the "tromboning" effect of traffic flows to local, short reach interfaces and avoid metro or long-haul optical networks.

In some example implementations, all of these services are implemented on standard x86 computing environments. As the network grows and changes, simply rearranging software elements can shift where these services are implemented. No service need be permanently fixed to a particular location or resource in the network. As such, the operator is able to adapt this system to their particular use case, load or traffic pattern, or policy requirements.

The combination and order of a particular set of services enabled for a packet flow is called a "service chain." The service chain may contain one or more elements to perform actions upon the packet flow, and the elements can be positioned local to the hub site or remotely across the IP/MPLS metro network.

In the example of FIG. 4, a flow of traffic 78A may be routed through a Lawful Intercept and Media Cache. Another flow of traffic 78B could go through only the Cloud CPE. The construct of the service chains may be entirely flexible and up to the discretion of the cable operator. The x86 compute devices and their resident NFV service functions may be connected to the network using standard Ethernet and/or MPLS VPN implementations, depending on the proximity of the services defined in the service chain to the edge router.

The particular services deployed in a service chain are up to the operator. A typical cable operator may pre-define several service chains for given service levels to subscribers, as illustrated in Table 1.

TABLE 1

| Chain | Flow | Description |
|-------|------|-------------|
| Set A | Internet > Subscriber | Today's status quo, HSD service |
| Set B | Internet > Cache > Subscriber | An HSD subscriber with video cache selectively enabled before the downstream |
| Set C | Internet > LI > Cache > Subscriber | HSD subscriber, data shipped off to remote LI collection before being routed to local cache then on to the downstream |
| Set D | Internet > Cloud CPE > Cache > Subscriber | Subscriber traffic bounces through two service elements before being routed downstream |

In one example implementation, this disclosure proposes a new Type-length-value (TLV) in the DOCSIS boot file to associate a specific DOCSIS service-flow with a specific NFV service chain. A vendor-specific TLV may initially be used, but in time this is envisioned to become part of an enhanced, standards based DOCSIS service definition mechanism.

Figure 5:
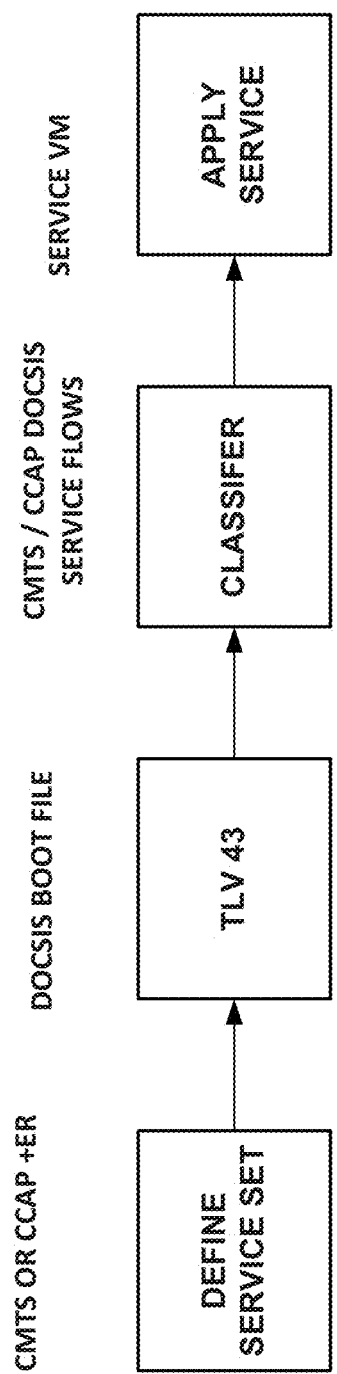
FIG. 5 is a block diagram illustrating an example workflow that shows the relationship between the CMTS or CCAP edge router, the DOCSIS boot file, the CMTS/CCAP DOCSIS service flows, and the service virtual machine.

FIG. 5 is a block diagram illustrating an example workflow that shows the relationship between the CMTS (e.g., CMTS 18 of FIG. 1) or CCAP ER (e.g., CCAP/ER 72 of FIG. 4), the DOCSIS bootfile, the CMTS/CCAP DOCSIS service flows, and the service VM. In general, one or more service chains (service sets) are defined on the CMTS, e.g., by direct configuration from an operator or in response to an SDN controller. Next, upon initializing a CM, the CMTS determines service chains for the particular subscriber flows, e.g., by extracting one or more embedded TLVs from the CM boot file that are directed to the CMTS instead of the CM fetching the boot file. Based on the TLVs, the CMTS may insert one or more classifiers to steer particular packet flows to service nodes executing virtual machines in the NFVs. Further details of the operation are explained below with respect to FIG. 6.

Figure 6:
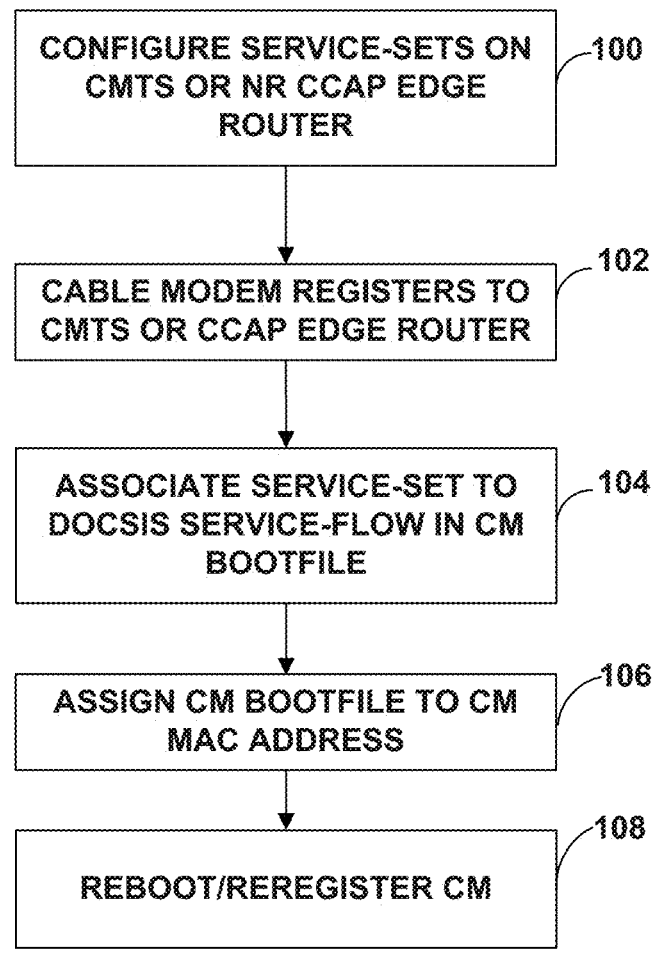
FIG. 6 is a flowchart illustrating an example operation of network devices in accordance with the techniques of this disclosure.

FIG. 6 is another flowchart illustrating an example operation of network devices in accordance with the techniques of this disclosure. Service-sets are configured on CMTS 18 or CCAP Edge Router 72, e.g., at NFV services config data 42 by a network operator or SDN controller via management interface 37 (FIG. 2) (100). Once in place, when the cable modem registers to the CMTS or NR CCAP (102), the specific service-flows defined in the DOCSIS boot file will be associated with NFV service-sets (104), and the data classified in those service-flows will be subject to the actions defined in the service-set. NFV module 39 stores this association, or mapping, to NFV services config data 42. The presence of one or more new TLVs in the DOCSIS cable modem boot file triggers NFV module 39 of CMTS 18 to map the service-chain to the appropriate packet flows defined in the DOCSIS cable modem boot file, and NFV module 30 stores this mapping to NFV services config data 42, such that packet flow redirection module 40 can redirect matching flows to NFV interface 38 for application of NFV services.

The CM boot file is assigned to the CM MAC address (106). For example, as described above with respect to FIG. 1, CMTS 18 may maintain a file at NFV services config data 42 associated with the one of CMs 22 and update this corresponding file with the association between the MAC address of the one of CMs 22 and the IP address, such as by relying on DHCP server 30B to provide this IP address resolution and assignment service to CMs 22. The cable modem reboots or re-registers (108). Future architectures may be able to dynamically associate DOCSIS service flows to NFV service-sets without rebooting the cable modem, through the use of SNMP, PCMM or similar centralized signaling mechanisms.

The use of DOCSIS Service Class Names could also be used to abstract the NFV portion of the ER configuration from the cable modem boot file's specific DOCSIS service-flows, depending on operator implementation and potential operator billing preferences. This would also permit more granular definition of the DOCSIS to NFV relationship in the running config of the ER or Integrated system.

The use of a VendorSpecific TLV ensures that if a CM registers to a legacy CMTS that does not have NFV support that the TLV is subsequently ignored. The CM will be allowed to come online, but there will be no benefits of the NFV infrastructure.

It is envisioned that the service-chains are configured universally across a cable operator's network to permit cable modem mobility, i.e., a cable modem is not tied to a particular CMTS or hub site. The service chains themselves need not operate identically—in one hub site an LI function could be local, in another it could be remote, but from the perspective of DOCSIS the operation is identical.

The NR-CCAP ER or CMTS will know the service-set, and location of the service instances, based on the running config of the system. A system in a smaller hub site may be configured to tunnel certain NFV flows back to a central location, while a system in a large hub site may locate services locally. Where services are instantiated depends upon the network topology, service requirements and other criteria defined by the operator.

The service-chain "Set C" from the previous examples, represented on a NR-CCAP ER or an integrated CMTS/CCAP, could be configured as follows. A representative XML schema that may be stored as configuration data within the edge router or CMTS is as follows:

```
<rpc-reply xmlns:junos="http://xml.juniper.net/junos/13.3X-cable/junos">
  <version>13.3X-cable [slt-builder]</version>
```

-continued

```
<services>
  <service-set Set-C>
    <docsis-flow-id 101>
      <chain>
        <service-instance>
          <target>LI-DataCenter-HQ</target>
        </service-instance>
        <service-instance>
          <target>Cache-HTTP-Local</target>
        </service-instance>
        <service-instance>
          <end/>
        </service-instance>
      </chain>
    </docsis-flow-id>
  </service-set>
<service-target>
  <name>LI-DataCenter-HQ</name>
  <location>remote</location>
  <access-via>
    <pwe3>
      <remote>
        <host>69.252.101.5</host>
        <vc-id>500</vc-id>
      </remote>
    </pwe3>
  </access-via>
</service-target>
<service-target>
  <name>Cache-HTTP-Local</name>
  <location>local</location>
  <access-via>
    <ethernet>
      <local>
        <interface>xe-5/3/2</host>
        <vlan-id>6</vlan-id>
      </local>
    </ethernet>
  </access-via>
</service-target>
</services>
```

In this example, the configuration defines the following within the edge router or CMTS:

A DOCSIS service flow reference, in this case, the value 101. This value will be matched against the same unique value present in the DOCSIS boot file, and thus provides the linkage between DOCSIS and the NFV chain defined in the configuration for the router/CMTS, The service-chain, through a series of service-instance statements, and The target elements of the service chain, one remote (LI-DataCenter-HQ) and one local (Cache-HTTP-Local) and the respective access methods to each chain element.

The following is an example portion from a DOCSIS boot modem configuration:

```
DsPacketClass
{
  ClassifierRef 101;
  ServiceFlowRef 101;
  ActivationState 1;
  IpPacketClassifier
  {
    IpProto 6;
    DstPortStart 80;
    DstPortEnd 80;
  }
  GenericTLV TlvCode 43 TlvLength 8 TlvValue 0x0803ffffff010100
}
DsServiceFlow
{
```

```
    DsServiceFlowRef 101;
    QosParamSetType 7;
    TrafficPriority 4;
    MaxRateSustained 5000000;
}
```

This configuration file uses a DOCSIS Downstream Packet Classifier to select all TCP traffic on port 80 and push it to NFV service chain having a unique identifier of 101. Upon snooping on this CM boot file, the CMTS detects embedded TLV 43 and installs the appropriate classifiers/filters to associate traffic for this subscriber with Service Flow 101, and rate limited to 50 Mb/s.

In this way, the operator can choose any combination of service flows, rate limits, TOS markings or packet classifiers when choosing which traffic will, or will not, be subject to NFV functionality, and provide such linkages within the configuration of the CMTS/router and the boot file that is fetched by the CM upon authentication of a particular subscriber.

Network Functions Virtualization represents a potential new area of innovation in cable high speed data services. Service chains can be constructed by the operator to increase network efficiency, enable new revenue opportunities, or any combination thereof. This disclosure provides various examples that allows DOCSIS-based broadband systems and the SDN community to be linked through software and services innovation. As the NFV and SDN communities mature, cable operators will be ready to take advantage of a next generation, revenue enhancing services-plane as described herein.

The techniques described in this disclosure may be implemented, at least in part, in hardware, software, firmware or any combination thereof. For example, various aspects of the described techniques may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit comprising hardware may also perform one or more of the techniques of this disclosure.

Such hardware, software, and firmware may be implemented within the same device or within separate devices to support the various operations and functions described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware or software components. Rather, functionality associated with one or more modules or units may be performed by separate hardware or software components, or integrated within common or separate hardware or software components.

The techniques described in this disclosure may also be embodied or encoded in a computer-readable medium, such as a computer-readable storage medium, containing instructions. Instructions embedded or encoded in a computer-readable medium may cause a programmable processor, or other processor, to perform the method, e.g., when the instructions are executed. Computer-readable media may include non-transitory computer-readable storage media and transient communication media. Computer readable storage media, which is tangible and non-transitory, may include random access memory (RAM), read only memory (ROM), programmable read only memory (PROM), erasable programmable read only memory (EPROM), electronically erasable programmable read only memory (EEPROM), flash memory, a hard disk, a CD-ROM, a floppy disk, a cassette, magnetic media, optical media, or other computer-readable storage media. It should be understood that the term "computer-readable storage media" refers to physical storage media, and not signals, carrier waves, or other transient media.

Various aspects of this disclosure have been described. These and other aspects are within the scope of the following claims.

The invention claimed is:

1. A method comprising:
    intercepting, by a network device, a transmission of a cable modem boot file from an FTP server to a cable modem by snooping on the transmission, wherein the cable modem boot file is for configuring a cable modem in a cable network;
    identifying, with the network device, based on the intercepted and snooped transmission of the cable modem boot file from the FTP server to the cable modem, information in the cable modem boot file that specifies an association between a specific Data Over Cable System Interface Specification (DOCSIS) service flow for the particular cable modem and a Network Function Virtualization (NFV) service chain defining a plurality of network services provided by a plurality of service nodes, wherein the service nodes provide an execution environment for the NFV service chain;
    determining that network traffic received from the cable modem matches the DOCSIS service flow; and
    re-directing the network traffic onto one or more tunnels to the NFV service chain for application of the network services provided by the plurality of service nodes that provide the execution environment for the NFV service chain.

2. The method of claim 1, wherein re-directing the network traffic comprises encapsulating the network traffic in a network tunnel and sending the encapsulated network traffic along the network tunnel to a first one of the service nodes locally positioned within the cable network.

3. The method of claim 1, wherein re-directing the network traffic comprises encapsulating the network traffic in a network tunnel and sending the encapsulated network traffic along the network tunnel to a first one of the service nodes positioned at a data center external to the cable network.

4. The method of claim 1, wherein identifying the information in the cable modem boot file comprises identifying a type-length-value embedded in the cable modem boot file for processing by the network device instead of the cable modem.

5. The method of claim 1, wherein receiving a cable modem boot file by a network device comprises receiving the cable modem boot file by a Cable Modem Termination System (CMTS).

6. The method of claim 1, wherein the network device comprises an edge router, and wherein receiving the cable modem boot file by the network device comprises the edge router intercepting the cable modem boot file by the edge router as the cable modem boot file is communicated from an FTP server to the cable modem.

7. The method of claim 1, wherein the NFV service chain defining the plurality of network services provided by the plurality of service nodes comprises a first NFV service chain defining a first plurality of network services provided by a first plurality of service nodes, the method further comprising receiving, with the network device, configuration from a software defined network (SDN) controller, wherein the configuration specifies a plurality of NFV service chains and a unique identifier for each of the NFV service chains, wherein the plurality of NFV service chains comprises the first NFV service chain, wherein each of the NFV service chains defines a respective plurality of network services provided by a respective plurality of service nodes.

8. A network device comprising:
  a control unit comprising a processor configured to process a cable modem boot file for configuring a cable modem in a cable network, wherein the processor intercepts and snoops on a transmission of the cable modem boot file from an FTP server to the cable modem and processes the cable modem boot file to extract information to identify, based on the intercepted and snooped transmission of the cable modem boot file from the FTP server to the cable modem, an association between a specific Data Over Cable System Interface Specification (DOCSIS) service flow and a Network Function Virtualization (NFV) service chain defining a plurality of network services provided by a plurality of service nodes, wherein the service nodes provide an execution environment for the NFV service chain; and
  a packet redirection module configured by the processor to detect that network traffic received from the cable modem matches the DOCSIS service flow and, in response to the detection, re-direct the network traffic onto one or more tunnels to the NFV service chain for application of the network services provided by the plurality of service nodes that provide the execution environment for the NFV service chain.

9. The network device of claim 8, wherein the packet redirection module encapsulates the network traffic in a network tunnel and sends the encapsulated network traffic along the network tunnel to a first one of the service nodes locally positioned within the cable network.

10. The network device of claim 8, wherein the packet redirection module encapsulates the network traffic in a network tunnel and sends the encapsulated network traffic along the network tunnel to a first one of the service nodes positioned at a data center external to the cable network.

11. The network device of claim 8,
  wherein the processor identifies one or more type-length-value (TLVs) embedded in the cable modem boot file for processing by the network device instead of the cable modem,
  wherein the TLV specifies the association between DOCSIS service flow for the cable modem and the service chain to be applied to the network traffic.

12. The network device of claim 8, wherein the network device comprises a Cable Modem Termination System (CMTS).

13. The network device of claim 8, wherein the network device comprises an edge router, and wherein the edge router intercepts the cable modem boot file as the cable modem boot file is communicated from an FTP server to the cable modem.

14. The network device of claim 8, wherein the NFV service chain defining the plurality of network services provided by the plurality of service nodes comprises a first NFV service chain defining a first plurality of network services provided by a first plurality of service nodes, the network device further comprising a management interface to receive configuration from a software defined network (SDN) controller,
  wherein the configuration specifies a unique identifier for each of a plurality of NFV service chains, wherein the plurality of NFV service chains comprises the first NFV service chain,
  wherein each of the configuration data further specifies, for each of the NFV service chains, traffic engineering information for transporting subscriber traffic through one or more of the plurality of service nodes.

15. A computer-readable storage device comprising instructions that, when executed, cause a programmable processor of a network device to:
  intercept, by a network device, a transmission of a cable modem boot file from an FTP server to a cable modem by snooping on the transmission, wherein the cable modem boot file is for configuring a cable modem in a cable network;
  identify, with the network device, based on the intercepted and snooped transmission of the cable modem boot file from the FTP server to the cable modem, information in the cable modem boot file that specifies an association between a specific Data Over Cable System Interface Specification (DOCSIS) service flow for the particular cable modem and a Network Function Virtualization (NFV) service chain defining a plurality of network services provided by a plurality of service nodes, wherein the service nodes provide an execution environment for the NFV service chain; and
  install a packet classifier within a forwarding component of the network device to detect network traffic received from the cable modem that matches the DOCSIS service flow and, in response to the detection, re-direct the network traffic onto one or more tunnels to the NFV service chain for application of the network services provided by the plurality of service nodes that provide the execution environment for the NFV service chain.

16. The method of claim 1, wherein the NFV service chain is implemented with standard off-the-shelf computers.

17. The method of claim 1, wherein the specific NFV service chain enables a path of the specific DOCSIS service flow through a series of NFV instances in the specific NFV service chain to be dynamically set up through software via a software defined network (SDN) controller.

18. The method of claim 1, wherein re-directing the network traffic comprises encapsulating the network traffic in a network tunnel and sending the encapsulated network traffic along the network tunnel to a plurality of the service nodes that provide the execution environment for the NFV service chain, wherein a path of the network tunnel is dynamically set up through software to comprise at least a respective one of the service nodes locally positioned within the cable network and at least a respective one of the service nodes positioned at a data center external to the cable network.

* * * * *